United States Patent
Chilimbi et al.

(10) Patent No.: US 7,140,008 B2
(45) Date of Patent: Nov. 21, 2006

(54) DYNAMIC TEMPORAL OPTIMIZATION FRAMEWORK

(75) Inventors: Trishul A. Chilimbi, Seattle, WA (US); Martin Hirzel, Boulder, CO (US)

(73) Assignee: Microsoft Corporation, Redmond, WA (US)

( * ) Notice: Subject to any disclaimer, the term of this patent is extended or adjusted under 35 U.S.C. 154(b) by 687 days.

(21) Appl. No.: 10/305,056

(22) Filed: Nov. 25, 2002

(65) Prior Publication Data

US 2004/0103401 A1 May 27, 2004

(51) Int. Cl.
*G06F 9/45* (2006.01)

(52) U.S. Cl. ................ 717/158; 717/153; 717/155

(58) Field of Classification Search ............... 717/158, 717/153, 155
See application file for complete search history.

(56) References Cited

U.S. PATENT DOCUMENTS

| | | | |
|---|---|---|---|
| 5,740,443 A * | 4/1998 | Carini ................. | 717/133 |
| 5,774,685 A | 6/1998 | Dubey | |
| 5,815,720 A * | 9/1998 | Buzbee ................ | 717/158 |
| 5,909,578 A * | 6/1999 | Buzbee ................ | 717/130 |
| 5,925,100 A | 7/1999 | Drewry et al. | |
| 5,940,618 A * | 8/1999 | Blandy et al. ........... | 717/128 |
| 5,950,003 A * | 9/1999 | Kaneshiro et al. ........ | 717/130 |
| 5,953,524 A * | 9/1999 | Meng et al. ............. | 717/108 |
| 5,960,198 A * | 9/1999 | Roediger et al. ......... | 717/130 |
| 6,026,234 A * | 2/2000 | Hanson et al. ........... | 717/133 |
| 6,079,032 A | 6/2000 | Peri ..................... | 717/131 |
| 6,148,437 A * | 11/2000 | Shah et al. ............. | 717/128 |
| 6,311,260 B1 | 10/2001 | Stone et al. | |
| 6,321,240 B1 | 11/2001 | Chilimbi et al. | |
| 6,330,556 B1 | 12/2001 | Chilimbi et al. | |
| 6,360,361 B1 | 3/2002 | Larus et al. | |
| 6,560,693 B1 | 5/2003 | Puzak et al. | |
| 6,571,318 B1 | 5/2003 | Sander et al. | |
| 6,651,243 B1 * | 11/2003 | Berry et al. ............ | 717/130 |
| 6,675,374 B1 | 1/2004 | Pieper et al. | |
| 6,704,860 B1 * | 3/2004 | Moore .................. | 712/237 |
| 6,848,029 B1 | 1/2005 | Coldewey | |
| 6,951,015 B1 | 9/2005 | Thompson | |
| 2002/0144245 A1 | 10/2002 | Lueh | |
| 2004/0015930 A1 * | 1/2004 | Wu ..................... | 717/158 |
| 2004/0025145 A1 | 2/2004 | Dawson | |

(Continued)

OTHER PUBLICATIONS

Arnold et al., *A Framework for Reducing the Cost of Instrumented Code*, Rutgers University Technical Report DCS-TR-424 (Nov. 2000).

(Continued)

*Primary Examiner*—Wei Zhen
*Assistant Examiner*—Qamrun Nahar
(74) *Attorney, Agent, or Firm*—Klarquist Sparkman, LLP

(57) ABSTRACT

A temporal profiling framework useful for dynamic optimization with hot data stream prefetching provides profiling of longer bursts and lower overhead. For profiling longer bursts, the framework employs a profiling phase counter, as well as a checking phase counter, to control transitions to and from instrumented code for sampling bursts of a program execution trace. The temporal profiling framework further intelligently eliminates some checks at procedure entries and loop back-edges, while still avoiding unbounded execution without executing checks for transition to and from instrumented code. Fast hot data stream detection analyzes a grammar of a profiled data reference sequence, calculating a heat metric for recurring subsequences based on length and number of unique occurrences outside of other hot data streams in the sequence with sufficiently low-overhead to permit use in a dynamic optimization framework.

32 Claims, 13 Drawing Sheets

U.S. PATENT DOCUMENTS

2004/0103408 A1  5/2004  Chilimbi et al.
2004/0215880 A1  10/2004  Chilimbi et al.
2005/0091645 A1  4/2005  Chilimbi et al.

OTHER PUBLICATIONS

Karlsson et al., *A Prefetching Technique for Irregular Accesses to Linked Data Structures*, Sixth International Symposium on High-Performance Computer Architecture (Jan. 2000).
Cooksey et al., *A Stateless, Content-Directed Data Prefetching Mechanism*, ACM (2002).
Klaiber et al., *An Architecture for Software-Controlled Data Prefetching*, ACM (1991).
Rubin et al., *An Efficient Profile-Analysis Framework for Data-Layout Optimizations*, POPL (Jan. 2002).
Hirzel et al., *Bursty Tracing: A Framework for Low-Overhead Temporal Profiling*, 4th ACM Workshop on Feedback-Directed and Dynamic Optimization (Dec. 2001).
Luk et al., *Compiler-Based Prefetching for Recursive Data Structures*, ACM (1996).
Anderson et al., *Continuous Profiling: Where Have All the Cycles Gone? ACM* (Nov. 1997).
Cahoon et al., *Data Flow Analysis for Software Prefetching Linked Data Structures in Java*, IEEE (2001).
Vanderwiel et al., *Data Prefetch Mechanisms*, ACM Computing Surveys, vol. 32, No. 2 (Jun. 2000).
Annavaram et al., *Data Prefetching by Dependence Graph Precomputation*, IEEE (2001).
Mowry et al., *Design and Evaluation of a Compiler Algorithm for Prefetching*, ACM (1992).
Chilimbi et al., *Dynamic Hot Data Stream Prefetching for General-Purpose Programs*, ACM, (2002).
Bala et al., *Dynamo: A Transparent Dynamic Optimization System*, ACM (2000).
Roth et al., *Effective Jump-Pointer Prefetching for Linked Data Structures*, IEEE (1999).
Ball et al., *Efficient Path Profiling*, IEEE (1996).
Chilimbi, *Efficient Representations and Abstractions for Quantifying and Exploiting Data Reference Locality*, ACMI (2001).
Jouppi, *Improving Direct-Mapped Cache Performance by the Addition of a Small Fully-Associative Cache and Prefetch Buffers*, IEEE (1990).
Saavedra et al., *Improving the Effectiveness of Software Prefetching With Adaptive Execution*, IEEE (1996).
Chilimbi et al., *On the Stability of Temporal Data Reference Profiles*, PACT (Sep. 2001).
Joseph et al., *Prefetching Using Markov Predictors*, ACM (1997).
Chen et al., *Reducing Memory Latency via Non-Blocking and Prefetching Caches*, ACM (1992).
Stoutchinin et al., *Speculative Prefetching of Induction Pointers*, Proceedings of 10th International Conference on Compiler Construction (2001).
Srivastava et al., *Vulcan Binary Transformation in a Distributed Environment*, Microsoft Research, MSR-TR-99-76 (Apr. 20, 2001).
Deaver et al., *Wiggins/Redstone: An On-line Program Specializer*, Proceedings of the IEEE Hot Chips XI Conference (Aug. 1999).
U.S. Appl. No. 11/134,812, filed May 20, 2005, Ganapathy et al.
U.S. Appl. No. 11/134,796, filed May 20, 2005, Shankar et al.
U.S. Appl. No. 11/115,924, filed Apr. 26, 2005, Chilimbi et al.
Ammons et al., "Exploiting Hardware Performance Counters with Flow and Context Sensitive Profiling", PLDI (Jun. 1997), 12 pages.
Ammons et al., "Improving Data-Flow Analysis with Path Profiles," SIGPLAN '98 (1998), pp. 72-84.
Balakrishnan et al., "Analyzing Memory Accesses in χ86 Binary Executables", Proc. 13th Intl. Conference on Compiler Construction, LNCS 2985 (Apr. 2004), pp. 5-23.
Berger et al., "Composing High-Performance Memory Allocators", ACM (2001), 11 pages.
Bush et al., "A Static Analyzer for Finding Dynamic Programming Errors", Software: Practice and Experience (2000), pp. 775-802.
Calder et al., "Cache-Conscious Data Placement", ACM (1998), 11 pages.
Chilimbi et al., "Cache-Conscious Structure Definition", *Proceedings of the ACM SIGPLAN '99* (May 1999), 12 pages.
Chilimbi et al., "Cache-Conscious Structure Layout", Proc. ACM SIGPLAN '99 Conf. on Programming Language Design and Impl., (May 1999), 12 pages.
Chilimbi et al., "Low-Overhead Memory Leak Detection Using Adaptive Statistical Profiling", Proc. 11th Intl. Conference on Architectural Support for Programming Language and Operating Systems (ASPLOS), (Oct. 2004), pp. 156-164.
Chilimbi et al., "Using Generational Garbage Collection to Implement Cache-Conscious Data Placement", Proceedings of the First International Symposium on Memory Management (Oct. 1998), vol. 34(3), pp. 37-48.
Cowan et al., "Buffer Overflows: Attacks and Defenses for the Vulnerability of the Decade", DARPA information survivability conference and expo (DISCEX) (2000), pp. 1-11.
Crescenzi at al., "A Compendium of NP Optimization Problems," [Downloaded from the World Wide Web on Dec. 12, 2003], 20 pages.
Dean et al., "ProfileMe: Hardware Support for Instruction-Level Profiling on Out-of-Order Processors", Proc. 30th Annual Intl. Symp. On Microarchitecture (Dec. 1997), 12 pages.
Demsky et al., "Automatic Detection and Repair of Errors in Data Structures", Proceedings of 18th ACM SIGPLAN Conference on Object-Oriented Programming Systems, Language and Applications (OOPLSA) (Oct. 2003), pp. 78-95.
Demsky et al., "Role-Based Exploration of Object-Oriented Programs", Proceedings of 24th International Conference on Software Engineering (ISCE) (May 2002), pp. 313-334.
Dor et al., "Cleanness Checking of String Manipulations in C Programs via Integer Analysis", Proc. 8th Int'l Static Analysis Symposium (Jun. 2001), 19 pages.
Dor et al., "CSSV: Towards a Realistic Tool for Statically Detecting All Buffer Overflows in C", PLDI'03 (Jun. 9-11, 2003), pp. 155-167.
Duesterwald et al., "Software profiling for hot path prediction: Less is more," Ninth International Conference on Architectural Support for Programming Languages and Operating Systems (Nov. 2000), pp. 202-211.
Edwards, "Black-Box Testing Using Flowgraphs: An Experimental Assessment of Effectiveness and Automation Potential", Software Testing, Verification and Reliability, vol. 10, No. 4 (Dec. 2000), pp. 249-262.
Eeckhout et al., "Workload Design: Selecting Representative Program-Input Pairs", Proceedings of the 2002 International Conference on Parallel Architectures and Compilation Techniques (2002), 12 pages.
Ernst, "Dynamically Discovering Likely Program Invariants", PhD Thesis, University of Washington (Aug. 2000), pp. 1-127.
Evans et al., "Improving Security Using Extensible Lightweight Static Analysis", IEEE Software (Jan./Feb. 2002), pp. 42-51.
Evans et al., "LCLint: A Tool for Using Specifications to Check Code", SIGSOFT Symposium on the Foundations of Software Engineering (Dec. 1994), 10 pages.
Evans et al., "Splint Manual, Version 3.1.1-1", Secure Programming Group, University of Virginia Department of Computer Science (Jun. 5, 2003), 121 pages.
Evans, "Static Detection of Dynamic Memory Errors", SIGPLAN Conf. on Programming Language and Design Implementation (May 1996), 10 pages.
Evans, "Using Specifications to Check Source Code", TR-628, MIT Lab for Computer Science (Jun. 1994), 97 pages.
Foster et al., "A Theory of Type Qualifiers", Proc. ACM SIGPLAN '99 Conf. on Programming Language and Design Implementation (PLDI) (May 1999), 12 pages.
Gloy et al., "Procedure Placement Using Temporal-Ordering Information", ACM Transactions on Programming Languages and Systems, vol. 21 (1999), pp. 111-161.
Guyer et al., "An Annotation Language for Optimizing Software Libraries", Proc. Second Conf. on Domain Specific Languages (Oct. 1999), 14 pages.

Halldorsson, "Approximations of Weighted Independent Set and Hereditary Subset Problems", *JGAA*, vol. 4, No. 1 (Apr. 2000), pp. 1-16.

Hangal et al., "Tracking Down Software Bugs Using Automatic Anomaly Detection", *Proceedings of 22nd International Conference on Software Engineering (ICSE)* (Jan. 1992), pp. 125-136.

Harris, "Dynamic Adaptive Pre-tenuring", *Proceedings of the International Symposium on Memory Management* (Oct. 2000), 9 pages.

Hastings et al., "Purify: Fast Detection of Memory Leaks and Access Errors", *Proceedings of the Winter 1992 USENIX Conference* (1992), 10 pages.

Heil et al., "Relational Profiling: Enabling Thread-Level Parallelism in Virtual Machines", *Proc. 33rd International Symposium on Microarchitecture* (Dec. 2000), pp. 1-10.

Hirzel et al., "Understanding the Connectivity of Heap Objects", *Proceedings of International Symposium on Memory Management (ISMM)* (Jun. 2002), pp. 143-156.

Hollingsworth et al., "MDL: A Language and Compiler for Dynamic Program Instrumentation", *Proc. Of the International Conference on Parallel Architectures and Compilations Techniques* (Nov. 1997), 12 pages.

Hölzle et al., "Reconciling Responsiveness with Performance in Purse Object-Oriented Languages", *ACM Transactions on Programming Languages and Systems* (Jul. 1996), pp. 1-40.

Horning, "The Larch Shared Language: Some Open Problems", *Compass/ADT Workshop* (Sep. 1995), 16 pages.

"JProfiler Manual," ejtechnologies, GmbH (2004), pp. 1-141.

Khurshid et al., "An Analyzable Annotation Language," *OOPSLA '02* (Nov. 2002), 15 pages.

Kistler et al., "Automated Data-Member Layout of Heap Objects to Improve Memory-Hierarchy Performance," *ACM Transactions on Programming Language and Systems*, (2000), 16 pages.

Kramer, "Examples of Design by Contract in Java Using Contract, the Design by Contract™ Tool for Java™", *Object World Berlin '99, Design & Components* (May 17-20, 1999), 26 pages.

Larochelle et al., "Statistically Detecting Likely Buffer Overflow Vulnerabilities", *2001 USENIX Security Symposium* (Aug. 2001), 5 pages.

Larus, "Whole Program Paths," *SIGPLAN '99 Conference on Programming Languages and Design* (1999), 11 pages.

Leavens et al., "Enhancing the Pre-and Postcondition Technique for More Expressive Specifications", *Proc. World Congress on Formal Methods in the Development of Computing Systems* (Sep. 1999), 21 pages.

Leavens et al., "Preliminary Design of JML", *Technical Report 98-06v, Iowa State University Department of Computer Science* (Jun. 1998-2003; revised May 2003), 94 pages.

Leino, "Checking Correctness Properties of Object-Oriented Programs," *Internet*, http://research.microsoft.com/leino/paper/1 (Aug. 19, 2002), 49 pages.

Melski et al., "Interprocedural Path Profiling", *University of Wisconsin* (1998), pp. 1-50.

Microsoft Corporation, "Scalable Program Analysis", *Internet*, http://research.microsoft.com/spa/ (downloaded on Sep. 5, 2003), 3 pages.

Mowry et al., "Predicting Data Cache Misses in Non-Numeric Applications Through Correlation Profiling", *International Symposium on Microarchitecture* (1997), 7 pages.

Nevill-Manning et al., "Identifying Hierarchical Structure in Sequences: A Linear-time Algorithm", *Journal of Artificial Intelligence Research* (1997), 7:67-82.

Petrank et al., "The Hardness of Cache Conscious Data Placement," *29th Annual ACM Symposium on Principles of Programming Language* (2002), 33 pages.

Roth et al., "Dependence Based Prefetching for Linked Data Structures", *Proceedings of the 8th International Conference on Architectural Support* (Oct. 1998), pp. 115-126.

Sastry et al., "Rapid Profiling Via Stratified Sampling", *International Symposium on Computer Architecture* (2001), pp. 1-12.

Savage et al., "Eraser: a dynamic data race detector for multighreaded programs", *ACM Transactions on Computer Systems (TOCS)* (1997), 391-411.

Seidl et al., "Segregating Heap Objects by Reference Behavior and Lifetime", *8th Int'l Conf. on Architectural Support for Programming Languages and Operating Systems* (Oct. 1998), 12 pages.

Shaham, "Automatic Removal of Array Memory Leaks in Java", (1999), 12 pages.

Srivastava, "ATOM: A System for Building Customized Program Analysis Tools", *SIGPLAN '94 Conf. on Programming Language Design and Impl.* (1994), 25 pages.

"Technologies for Measuring Software Performance", *Intel Corporation* (2003), 4 pages.

Traub et al., "Ephemeral instrumentation for lightweight program profiling", *Technical report*, Harvard University (2000), pp. 1-13.

Truong et al., "Improving Cache Behavior of Dynamically Allocated Data Structures", *PACT* (1998), 8 pages.

Wahls et al., "The Direct Execution of SPECS-C++: A Model-Based Specification Language for C++ Classes", *Technical Report TR94-02b, Iowa State University Department of Computer Science* (Nov. 18, 1994), 52 pages.

Zhou et al., "AccMon: Automatically Detecting Memory-Related Bugs via Program Counter-Based Invariants," *Proceedings of 37th International Symposium on Micro-Architecture (MICRO)* (Dec. 2004).

Zilles et al., "A Programmable Co-processor for Profiling", *Proceedings of the 7th International Symposium on High Performance Architecture* (Jan. 2001), 12 pages.

* cited by examiner

Figure 4

```
400
  ↓
       // fast path, executed on every check
410 ─── nCheck--;
420 ─── if (nCheck ≠ 0) goto target_checking;   // we were in checking code and stay there // fall-through to remainder of check, executed infrequently
       nCheck = 1;
430 ─── if (nInstr == 0){
           nInstr = nInstr_0;
           goto target_instrumented;         // transition from checking to instrumented code
440 ─── }
       nInstr--;
450 ─── if (nInstr ≠ 0) goto target_instrumented;  // we were in instrumented code and stay there
460 ─── nCheck = nCheck_0;
       goto target_checking;                  // transition from instrumented to checking code
``` abaabcabcabcabc

INPUT STRING
910

S → AaBB

A → ab

B → CC

C → Ac

SEQUITUR GRAMMAR
900

DAG REPRESENTATION
920

1010 — //find reverse post-order numbering for non-terminals
```
int next = nRules;
function doNumbering = lambda(NonTerminal A){
    if(have not yet visited A){
        for(each child B of A)
            doNumbering(B);
        next--;
        A.index = next;
    }
}
doNumbering(S);
```
//find uses for non-terminals, initialize coldUses to uses
1020 —
```
for(each non-terminal A)
    A.uses = A.coldUses = 0;
S.uses = S.coldUses = 1;
for(each non-terminal A, ascending order of A.index)
    for(each child B or A)
        B.uses = B.coldUses = (B.uses + A.uses);
```
//find hot non-terminals
1030 —
```
for(each non-terminal A, ascending order of A.index){
    A.heat = wA.length * A.coldUses;
    fHot = minLen<=A.length<=maxLen && H<=A.heat;
    if(fHot)
        reportHotDataStream(wA, A.heat);
    subtract = fHot ? A.uses : (A.uses-A.coldUses);
    for(each child B of A)
        B.coldUses = B.coldUses - subtract;
}
```

Figure 11
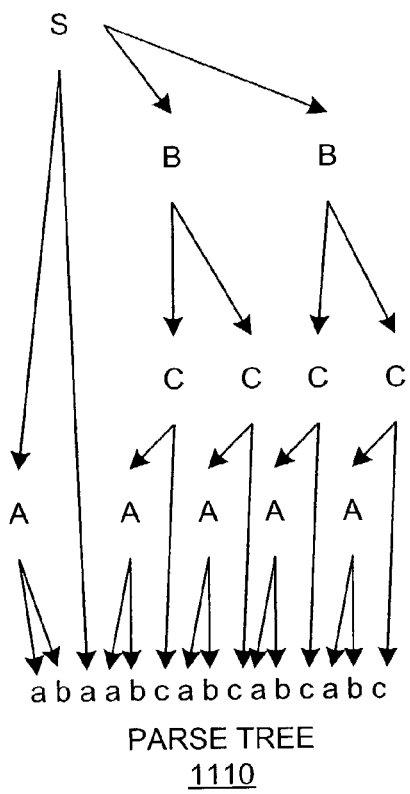
PARSE TREE
1110
GRAMMAR
(OMITTING TERMINALS)
1120
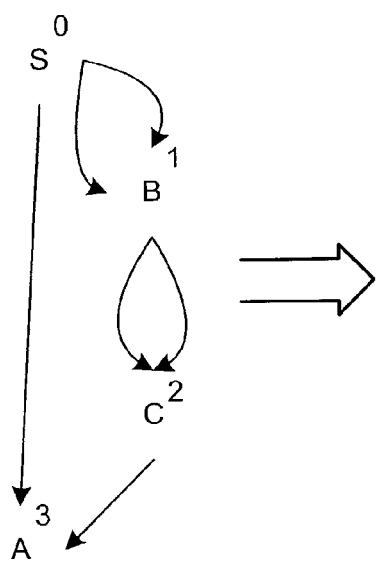
REVERSE
POSTORDER
NUMBERING
1130
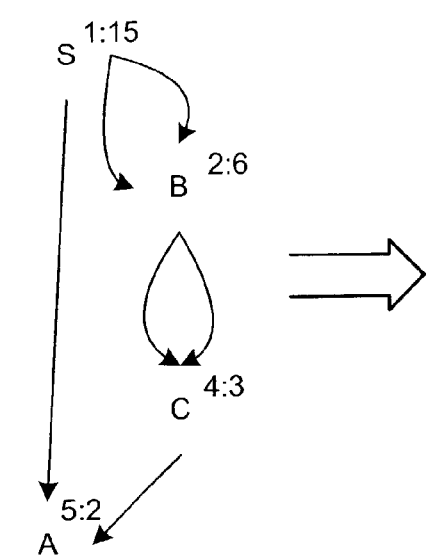
USES: WORD
LENGTH
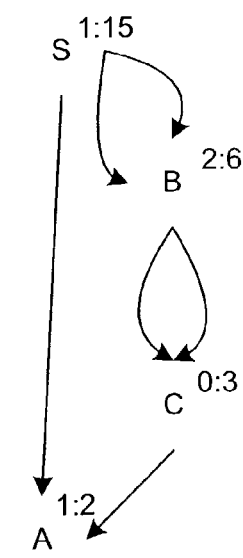
COLD USES:
WORD LENGTH

| X | Child | Length | Index | Use | Cold-Use | Heat | Report? |
|---|---|---|---|---|---|---|---|
| S | A,B,B | 15 | 0 | 1 | 1 | 15 | no, start |
| A | - | 2 | 3 | 5 | 1 | 2 | no,cold |
| B | C,C | 6 | 1 | 2 | 2 | 12 | yes |
| C | A | 3 | 2 | 4 | 0 | 0 | no,cold |

Dynamic Optimization Software 1380

DYNAMIC TEMPORAL OPTIMIZATION FRAMEWORK

TECHNICAL FIELD

The present invention relates to temporal profiling and memory access optimization of computer programs, and particularly for dynamic optimization during program execution.

BACKGROUND

With processor speed increasing much more rapidly than memory access speed, there is a growing performance gap between processor and memory in computers. More particularly, processor speed continues to adhere to Moore's law (approximately doubling every 18 months). By comparison memory access speed has been increasing at the relatively glacial rate of 10% per year. Consequently, there is a rapidly growing processor-memory performance gap. Computer architects have tried to mitigate the performance impact of this imbalance with small high-speed cache memories that store recently accessed data. This solution is effective only if most of the data referenced by a program is available in the cache. Unfortunately, many general-purpose programs, which use dynamic, pointer-based data structures, often suffer from high cache miss rates, and therefore are limited by memory system performance.

Due to the increasing processor-memory performance gap, memory system optimizations have the potential to significantly improve program performance. One such optimization involves prefetching data ahead of its use by the program, which has the potential of alleviating the processor-memory performance gap by overlapping long latency memory accesses with useful computation. Successful prefetching is accurate (i.e., correctly anticipates the data objects that will be accessed in the future) and timely (fetching the data early enough so that it is available in the cache when required). For example, T. Mowry, M. Lam and A Gupta, "Design And Analysis Of A Compiler Algorithm For Prefetching," Architectural Support For Programming Languages And Operating Systems (ASP-LOS) (1992) describe an automatic prefetching technique for scientific codes that access dense arrays in tightly nested loops, which relies on static compiler analyses to predict the program's data accesses and insert prefetch instructions at appropriate program points. However, the reference pattern of general-purpose programs, which use dynamic, pointer-based data structures, is much more complex, and the same techniques do not apply.

An alternative to static analyses for predicting data access patterns is to perform program data reference profiling. Recent research has shown that programs possess a small number of "hot data streams," which are data reference sequences that frequently repeat in the same order, and these account for around 90% of a program's data references and more than 80% of cache misses. (See, e.g., T. M. Chilimbi, "Efficient Representations And Abstractions For Quantifying And Exploiting Data Reference Locality," Proceedings Of The ACM SIGPLAN '01 Conference On Programming Language Design And Implementation (June 2001; and S. Rubin, R. Bodik and T. Chilimbi, "An Efficient Profile-Analysis Framework For Data-Layout Optimizations," Principles Of Programming Languages, POPL'02 (January 2002).) These hot data streams can be prefetched accurately since they repeat frequently in the same order and thus are predictable. They are long enough (15–20 object references on average) so that they can be prefetched ahead of use in a timely manner.

In prior work, Chilimbi instrumented a program to collect the trace of its data memory references; then used a compression technique called Sequitur to process the trace off-line and extract hot data streams. (See, T. M. Chilimbi, "Efficient Representations And Abstractions For Quantifying And Exploiting Data Reference Locality," Proceedings Of The ACM SIGPLAN '01 Conference On Programming Language Design And Implementation (June 2001).) Chilimbi further demonstrated that these hot data streams are fairly stable across program inputs and could serve as the basis for an off-line static prefetching scheme. (See, T. M. Chilimbi, "On The Stability Of Temporal Data Reference Profiles," International Conference On Parallel Architectures And Compilation Techniques (PACT) (2001).) However, this off-line static prefetching scheme may not be appropriate for programs with distinct phase behavior.

Dynamic optimization uses profile information from the current execution of a program to decide what and how to optimize. This can provide an advantage over static and even feedback-directed optimization, such as in the case of the programs with distinct phase behavior. On the other hand, dynamic optimization must be more concerned with the profiling overhead, since the slow-down from profiling has to be recovered by the speed-up from optimization.

One common way to reduce the overhead of profiling is through use of sampling: instead of recording all the information that may be useful for optimization, sample a small, but representative fraction of it. In a typical example, sampling counts the frequency of individual events such as calls or loads. (See, J. Anderson et al., "Continuous Profiling: Where Have All The Cycles Gone?," ACM Transactions On Computer Systems (TOCS) (1997).) Other dynamic optimizations exploit causality between two or more events. One example is prefetching with Markov-predictors using pairs of data accesses. (See, D. Joseph and D. Grunwald, "Prefetching Using Markov Predictors," International Symposium On Computer Architecture (ISCA) (1997).) Some recent transparent native code optimizers focus on single-entry, multiple-exit code regions. (See, e.g., V. Bala, E. Duesterwald and S. Banerjia, "Dynamo: A Transparent Dynamic Optimization System," Programming Languages Design And Implementation (PLDI) (2000); and D. Deaver, R. Gorton and N. Rubin, "Wiggins/Redstone: An On-Line Program Specializer," Hot Chips (1999).) Another example provides cache-conscious data placement during generational garbage collection to lay out sequences of data objects. (See, T. Chilimbi, B. Davidson and J. Larus, "Cache-Conscious Structure Definition," Programming Languages Design And Implementation (PLDI) (1999); and T. Chilimbi and J. Larus, "Using Generational Garbage Collection To Implement Cache-Conscious Data Placement," International Symposium On Memory Management (ISMM) (1998).) However, for lack of low-overhead temporal profilers, these systems usually employ event profilers. But, as Ball and Larus point out, event (node or edge) profiling may misidentify frequencies of event sequences. (See, T. Ball and J. Larus, "Efficient Path Profiling," International Symposium On Microarchitecture (MICRO) (1996).)

The sequence of all events occurring during execution of a program is generally referred to as the "trace." A "burst" on the other hand is a subsequence of the trace. Arnold and Ryder present a framework that samples bursts. (See, M. Arnold and B. Ryder, "A Framework For Reducing The Cost Of Instrumented Code," Programming Languages Design And Implementation (PLDI) (2001).) In their framework, the code of each procedure is duplicated. (Id., at FIG. 2.) Both versions of the code contain the original instructions, but only one version is instrumented to also collect profile information. The other version only contains checks at procedure entries and loop back-edges that decrement a counter "nCheck," which is initialized to "$nCheck_0$." Most of the time, the (non-instrumented) checking code is executed. Only when the nCheck counter reaches zero, a single intraprocedural acyclic path of the instrumented code is executed and nCheck is reset to $nCheck_0$.

A limitation of the Arnold-Ryder framework is that it stays in the instrumented code only for the time between two checks. Since it has checks at every procedure entry and loop back-edge, the framework captures a burst of only one acyclic intraprocedural path's worth of trace. In other words, only the burst between the procedure entry check and a next loop back-edge is captured. This limitation can fail to profile many longer "hot data stream" bursts, and thus fail to optimize such hot data streams. Consider for example the code fragment:

for (i=0; i<n; i++)
if ( . . . ) f( );
else g( );

Because the Arnold-Ryder framework ends burst profiling at loop back-edges, the framework would be unable to distinguish the traces fgfgfgfg and ffffgggg. For optimizing single-entry multiple-exit regions of programs, this profiling limitation may make the difference between executing optimized code most of the time or not.

Another limitation of the Arnold-Ryder framework is that the overhead of the framework can still be too high for dynamic optimization of machine executable code binaries. The Arnold-Ryder framework was implemented for a Java virtual machine execution environment, where the program is a set of Java class files. These Java programs typically have a higher execution overhead, so that the overhead of the instrumentation checks is smaller compared to a relatively slow executing program. The overhead of the Arnold-Ryder framework's instrumentation checks may make dynamic optimization with the framework impractical in other settings for programs with lower execution overhead (such as statically compiled machine code programs).

A further problem is that the overhead of hot data stream detection has been overly high for use in dynamic optimization systems, such as the Arnold-Ryder framework.

SUMMARY

Techniques described herein provide low-overhead temporal profiling and analysis, such as for use in dynamic memory access optimization.

In accordance with one technique described herein, temporal profiling of longer bursts in a program trace is achieved by incorporating symmetric "checking code" and "instrumented code" counters in a temporal profiling framework employing non-instrumented (checking) code and instrumented code versions of a program. Rather than immediately transitioning back to the checking code at a next proximate check in the instrumented code as in the prior Arnold-Ryder framework, a counter also is placed on checks in the instrumented code. After transitioning to the instrumented code, a count of plural checks in the instrumented code is made before returning to the checking code. This permits the instrumented code to profile longer continuous bursts sampled out of the program trace.

In accordance with further techniques, the overhead of temporal profiling is reduced by intelligently eliminating checks. In the prior Arnold-Ryder framework, checks were placed at all procedure entries and loop back-edges in the code to ensure that the program can never loop or recurse for an unbounded amount of time without executing a check. The techniques intelligently eliminate checks from procedure entries and loop back-edges. In one implementation, the intelligent check elimination performs a static call graph analysis of the program to determine where checks should be placed on procedure entries to avoid unbounded execution without checking. Based on the call graph analysis, the intelligent check elimination places checks at entries to root procedures, procedures whose address is taken, and procedures with recursion from below. On the other hand, the intelligent check elimination does not place checks on leaf procedures (that call no other code in the program) in the call graph. Further, the intelligent check elimination eliminates checks at loop back-edges of tight inner loops, and at "k-boring loops" (loops with no calls and at most k profiling events of interest, since these are easy for a compiler to statically optimize). Other techniques to reduce checks also can be employed. This reduction in temporal profiling overhead can make dynamic optimization practical for faster executing programs (e.g., binary code), as well as improving efficiency of dynamic optimization of just-in-time compiled (JITed) code and interpreted programs.

In accordance with another technique, an improved hot data stream detection more quickly identifies hot data streams from profiled bursts of a program, which can make dynamic prefetching practical for dynamic optimization of programs. In one implementation, the improved hot data stream detection constructs a parse tree of the profiled bursts, then forms a Sequitur grammar from the parse tree. The improved hot stream detection then traverses the grammar tree in reverse postorder numbering order. At each grammar element, the improved hot stream detection calculates a regularity magnitude or "heat" of the element based on a length of the burst sequence represented by the element multiplied by its number of "cold" uses (i.e., number of times the element occurs in the complete parse tree, not counting occurrences as sub-trees of another "hot" element). The improved hot stream detection identifies elements as representing "hot data streams" if their heat exceeds a heat threshold.

Additional features and advantages of the invention will be made apparent from the following detailed description that proceeds with reference to the accompanying drawings.

BRIEF DESCRIPTION OF THE DRAWINGS

FIG. 4 is a program code listing for a check to control transitions between checking and instrumented code versions in the improved framework of FIG. 3 for longer burst profiling.

FIG. 10 is a program code listing for fast hot data stream detection in the processing by the dynamic optimizer shown in FIG. 7.

FIG. 11 is an illustration of the fast hot data stream detection performed according to the program code listing of FIG. 10 on the grammar of the exemplary data reference sequence from FIG. 9.

FIG. 12 is a table listing results of the fast hot data stream detection illustrated in FIG. 11.

DETAILED DESCRIPTION

The following description is directed to techniques for low-overhead, long burst temporal profiling and fast hot data stream detection, which can be utilized in dynamic optimization of computer programs. More particularly, these technique are described in their particular application to a dynamic optimization involving hot data stream prefetching to optimize a program's memory accesses. However, the techniques can be applied in contexts other than the described hot data stream prefetching dynamic optimization.

1. Overview of Dynamic Optimizer

Figure 1:
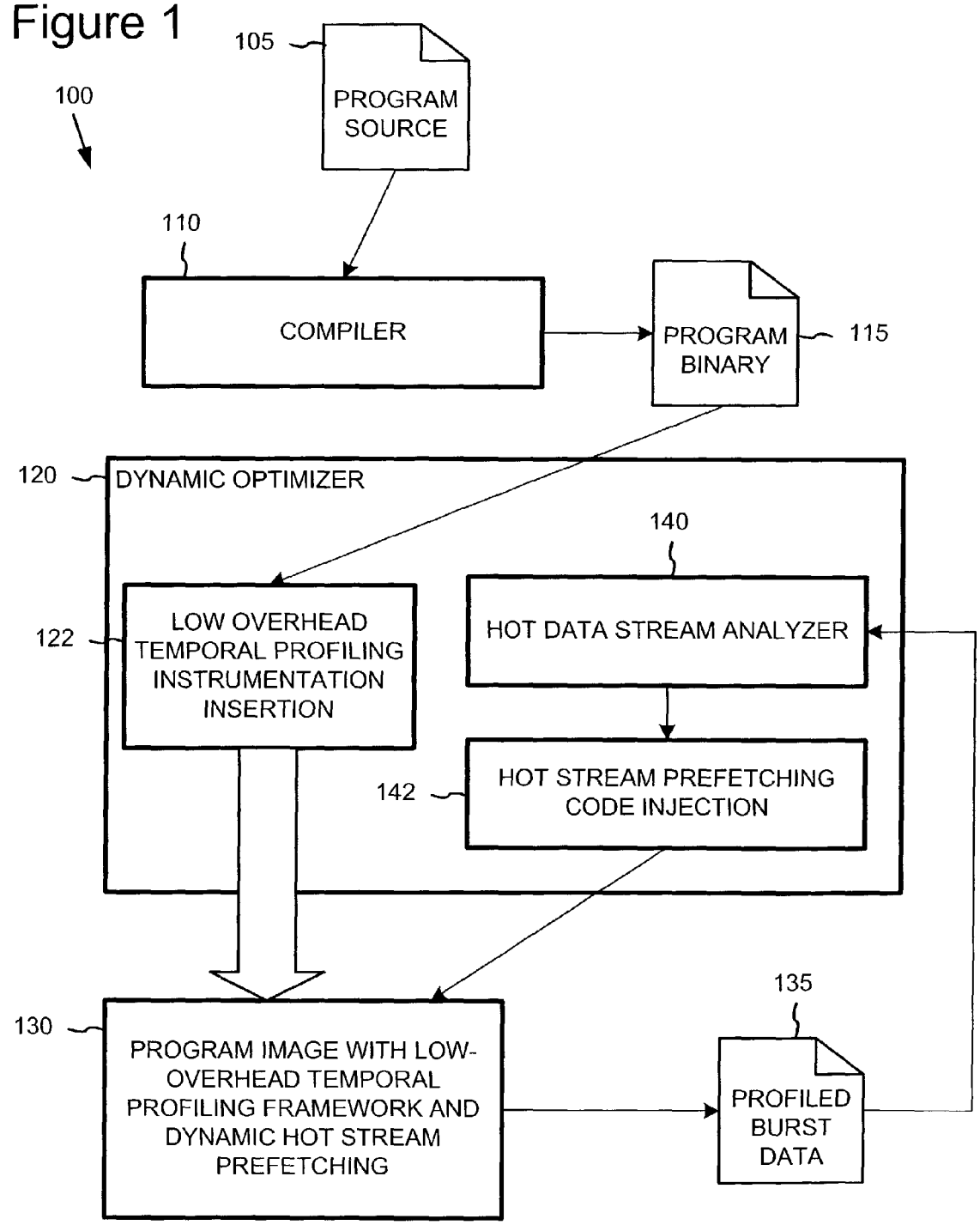
FIG. 1 is a data flow diagram of a dynamic optimizer utilizing a low overhead, long burst temporal profiling framework and fast hot data stream detection to dynamically optimize a program with dynamic hot data stream prefetching.

With reference to FIG. 1, an exemplary dynamic optimizer 100 utilizes techniques described more fully herein below for low-overhead, long burst temporal profiling and fast hot data stream detection in a process of dynamically optimizing a computer program. The exemplary dynamic optimizer 120 includes a program editing tool 122 to build a program image 130 in accordance with a low-overhead temporal profiling framework described below, including inserting instrumentation and checking code for profiling long burst samples of a trace of the program's execution. In the exemplary dynamic optimizer, the program editing tool 122 inserts the instrumentation and checking code for the low-overhead temporal profiling framework by editing an executable or binary version 115 of the program to be optimized, after compiling and linking by a conventional compiler from the program's source code version. For example, the source code 105 of the program to be optimized may be initially written by a programmer in a high level programming language, such as C or C++. Such program source code is then compiled using an appropriate conventional compiler 110, such as a C/C++ compiler available in the Microsoft® Visual Studio development platform, to produce the machine-executable program binary 115. The executable editing tool for the instrumentation insertion 122 can be the Vulcan executable editing tool for x86 computer platform program binaries, which is described in detail by A. Srivastava, A. Edwards, and H. Vo, "Vulcan: Binary Transformation In A Distributed Environment," Technical Report MSR-TR-2001-50, Microsoft Research (2001). This has the advantage that the dynamic optimizer does not require access to the source code, and can employed to optimize programs where only an executable binary version is available. In other embodiments, the profiling framework can be built into the program image 130 as part of the process of compiling the program from source code or an intermediate language form, such as for use with programs written in Java, or intermediate code representations for the Microsoft .Net platform. In such other embodiments, the compiler that inserts instrumentation and checks embodies the tool 122.

The temporal profiling framework provided in the program image 130 produces profiled burst data 135 representing sampled bursts of the program's execution trace. The exemplary dynamic optimizer 120 includes a hot data stream analyzer 140 and hot stream prefetching code injection tool 142. The hot data stream analyzer 140 implements fast hot data stream detection described herein below that process the profiled burst data to identify "hot data streams," which are frequently recurring sequences of data accesses by the program. The hot stream prefetching code injection tool 142 then dynamically modifies the program image 130 to perform prefetching so as to optimize cache utilization and data accesses by the program, based on the identified hot data streams.

2. Temporal Profiling Framework

Figure 2:
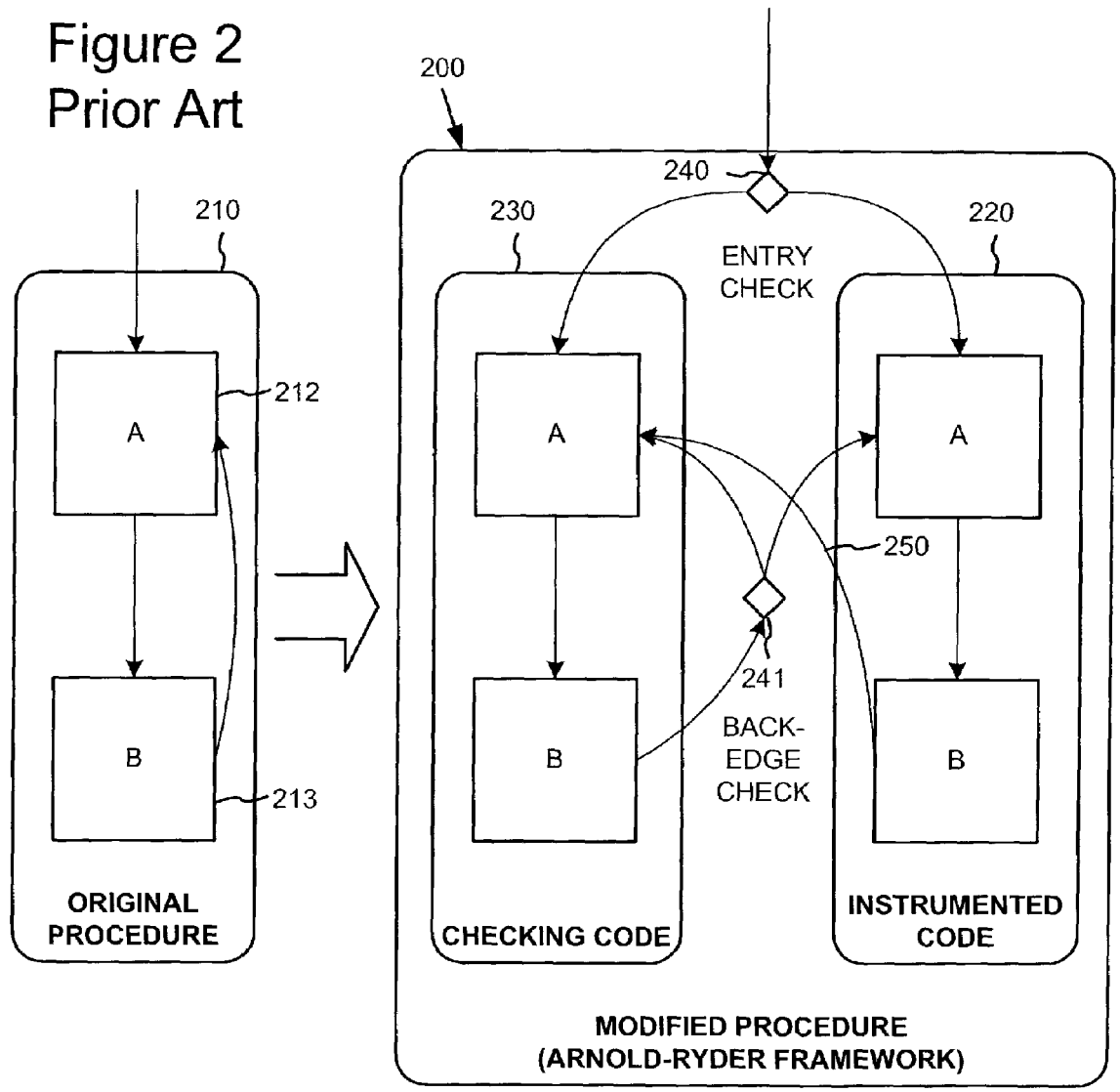
FIG. 2 is a block diagram of a program modified according to the prior Arnold-Ryder framework for burst profiling.
Figure 3:
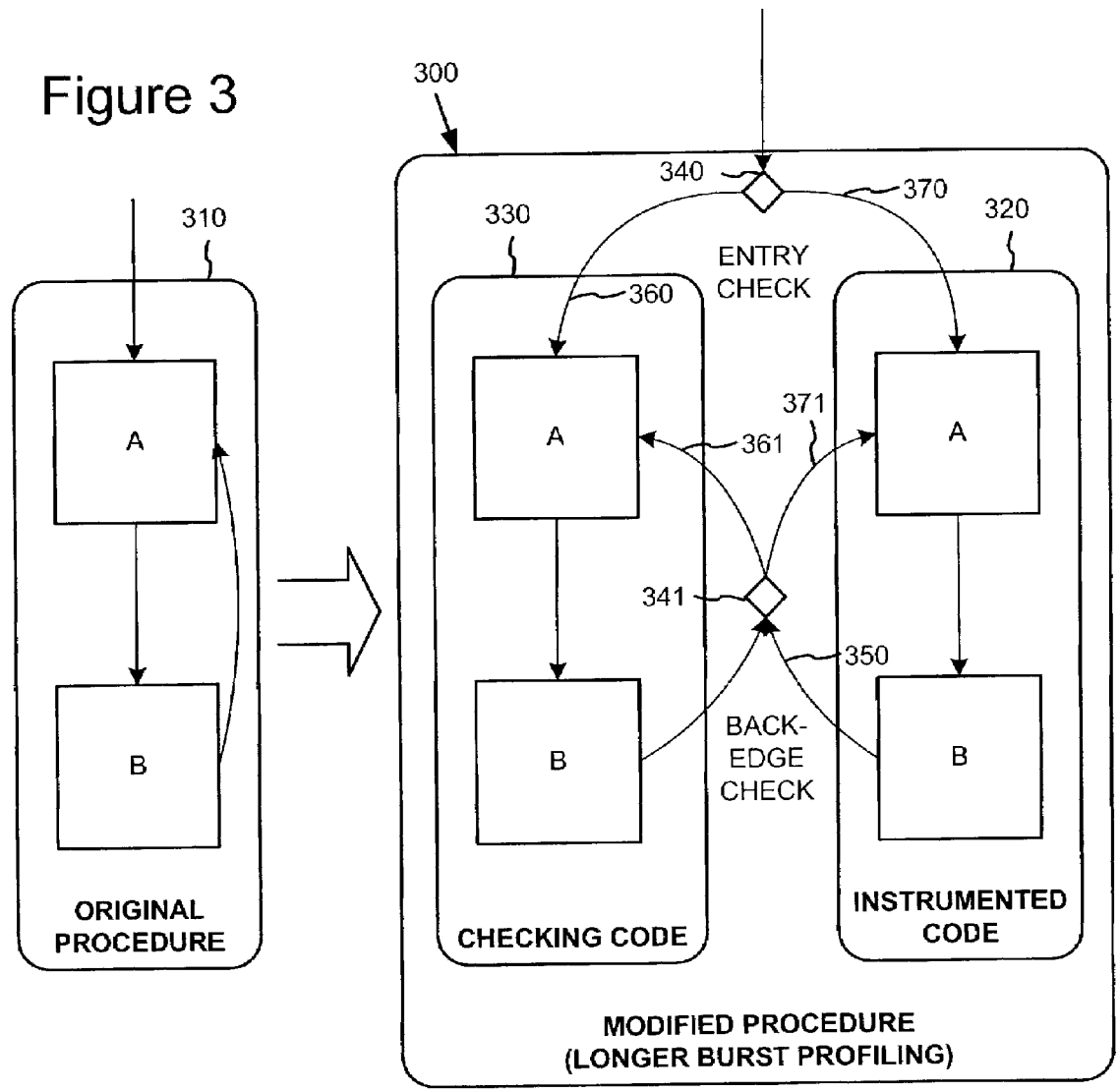
FIG. 3 is a block diagram of a program modified according to an improved framework for longer burst profiling in the dynamic optimizer of FIG. 1.

The program image 130 (FIG. 1) is structured according to a low-overhead, long burst temporal profiling framework 300 illustrated in FIG. 3, which is an improvement on the prior Arnold-Ryder framework 200 (FIG. 2).

In the prior Arnold-Ryder framework 200, the code of each procedure from an original program version (e.g., original procedure 210 with code blocks 212–213) is duplicated. Both duplicate versions of the code in the framework 200 contain the original instructions, but only one version is instrumented to also collect profile information (referred to herein as the "instrumented code" 220). The other version (referred to herein as the "checking code" 230) only contains checks 240–241 at procedure entries and loop back-edges that decrement a counter "nCheck," which is initialized to "$nCheck_0$." Most of the time, the (non-instrumented) checking code 230 is executed. Only when the nCheck counter reaches zero, a single intraprocedural acyclic path of the instrumented code 220 is executed and nCheck is reset to $nCheck_0$. All back-edges 250 in the instrumented code 220 transition back to the checking code 230.

While executing in the instrumented code 220, the Arnold-Ryder framework 200 profiles a burst out of the program execution trace, which begins at a check (e.g., procedure entry check 240 or back-edge check 241) and extends to the next check. In other words, the profiling captures one intraprocedural acyclic path. The profile of the program captured during execution of this path can be, for example, the data accesses made by the program.

Profiling Longer Bursts

The improved framework 300 extends the prior Arnold-Ryder framework 200 (FIG. 2) so that profiled bursts can extend over multiple checks, possibly crossing procedure boundaries. This way, the improved framework can obtain interprocedural, context-sensitive and flow-sensitive profiling information.

As in the Arnold-Ryder framework 200, the improved framework 300 is structured to include duplicate non-instrumented ("checking code") 330 and instrumented code 320 versions of at least some original procedures 310 of the program. Further, checks 340–341 are placed at procedure entry and loop back-edges.

The extension in the improved framework 300 adds a second "profiling phase" counter (labeled "nlnstr") to make execution flow in the instrumented code 320 symmetric with the checking code 330. Further, the loop back-edges 350 from the instrumented code 320 do not transition directly back to the procedure entry as in the prior Arnold-Ryder framework 200, but instead go to a back-edge check 341.

The program logic or code 400 for the checks 340–341 is shown in FIG. 4. Initially, the value of the checking phase counter ("nCheck") is set to its initial value, "$nCheck_0$." While in the checking code 400, the framework 300 decrements the checking phase counter (nCheck) (statement 410) at every check 340–341. The framework 300 continues to execute in the checking code (statement 420) as long as the value of the checking phase counter has not yet reached zero. For example, from the entry and back-edge checks 340–341, the framework 300 takes the paths 360–361 to the checking code 330.

When the checking phase counter (nCheck) reaches zero, the framework 300 initializes the profiling phase counter (nlnstr) to an initial value, $nlnstr_0$, and transitions to the instrumented code 320 (statement 430). In general, the checking phase counter's initial value is selected to be much greater than that of the profiling phase counter (i.e., $nlnstr_0 \ll nCheck_0$), which determines the sampling rate of the framework ( $r = nlnstr_0 (nCheck_0 + nlnstr_0)$).

While executing in the instrumented code, the framework 300 decrements the profiling phase counter (nlnstr) at every check 340–341 (statement 440). The framework 300 continues to execute in the instrumented code (statement 450) as long as the value of the profiling phase counter has not yet reached zero. For example, from the entry and back-edge checks 340–341, the framework 300 takes the paths 370–371 to the instrumented code 320. When the profiling phase counter reaches zero, the framework again initializes the checking phase counter to the initial value, $nCheck_0$, and returns to the checking code 330 (statement 460).

The check code 400 is structured so that in the common case where the framework is executing in the checking code and is to continue executing the checking code (checking phase), the check consists of a decrement of the checking phase counter and a conditional branch.

Compared to the prior Arnold-Ryder framework 200, the improved framework 300 profiles longer bursts of the program trace and provides more precise profiles. For example, consider the following code fragment:

for (i=0; i<n; i++)
  if ( ... ) f( );
  else g( );

In this example code fragment, the Arnold-Ryder framework returns to the checking code upon the back-edge path from each execution of the procedures, f( ) and g( ). Accordingly, the Arnold-Ryder framework profiles only on acyclic intra-procedural path of the program trace, and would be unable to distinguish the traces, fgfgfgfg and fffgggg. The improved framework 300 profiles longer bursts across procedure boundaries. In the dynamic optimizer 120 (FIG. 1), this can make a difference between executing optimized code most of the time or not.

Low-overhead Temporal Profiling

For the dynamic optimization to effectively enhance the performance of the program, the overhead imposed by the temporal profiling framework desirably is relatively small compared to the overall program execution, so that performance gains are achieved from dynamically optimizing the program. The overhead of the temporal profiling framework can be particularly significant in the exemplary dynamic optimizer 120 in which the program image 130 is built from editing an executable program binary 115, to which the compiler 110 has already applied many static optimizations. In such case, the overhead of the prior Arnold-Ryder framework may be too high for effective dynamic optimization. The prior Arnold-Ryder framework has checks at all procedure entries and loop back-edges to insure that the program can never loop or recurse for an unbounded amount of time without executing a check. Otherwise, sampling could miss too much profiling information (when the program spends an unbounded amount of time in the checking code), or the overhead could become too high (when the program spends an unbounded amount of time in the instrumented code).

The low-overhead temporal profiling framework described herein decreases the overhead of the burst sampling by intelligently eliminating some checks (i.e., placing checks at fewer than all procedure entries and loop back-edges), while still ensuring that the program does not spend an unbounded amount of time without executing a check.

Eliminating Checks at Procedure Entries

In the low-overhead temporal profiling framework, the instrumentation tool 122 places checks at an approximated minimum set of procedure entries so that the program cannot recurse for an unbounded amount of time without executing a check. The instrumentation tool 122 performs a static call graph analysis of the program 115 to determine this approximate minimum set ($C \subseteq N$) of nodes in the program's call graph, such that every cycle in the call graph contains at least one node of the set.

In the dynamic optimizer 120, the instrumentation tool 122 selects this set ($C \subseteq N$) of procedures f at which to place procedure entry checks, according to the criteria represented in the following expression:

$$C = \{f \in N \mid \begin{array}{l} \neg \text{ is\_leaf}(f) \wedge \\ (\text{is\_root}(f) \vee \text{addr\_taken}(f) \vee \text{recursion\_from\_below}(f)) \end{array} \}$$

In accordance with this criteria, the instrumentation tool 122 does not place any check on any entry to a leaf procedure (i.e., a procedure that calls nothing), since such leaf procedures cannot be part of a recursive cycle. Otherwise, the instrumentation tool 122 places a check on entries to all root procedures (i.e., procedures that are only called from outside the program), so as to ensure that execution starts in the correct version of the code. Also, the tool places a check on entry to every procedure whose address is taken, since such procedures may be part of recursion with indirect calls. Further, the tool places a check on entry to every procedure with recursion from below. A procedure f has recursion from below, iff it is called by g in the same strongly connected component as f that is at least as far away from the roots. The distance of a procedure f from the roots is the minimum length of the shortest path from a root to f.

The "recursion_from_below" heuristic in this criteria guarantees that there is no recursive cycle without a check and breaks the ties to determine where in the cycle to put the check (similarly to back-edges in loops). The tool breaks ties so that checks are as far up in the call-stack as possible. This should reduce the number of dynamic checks.

Figure 5:
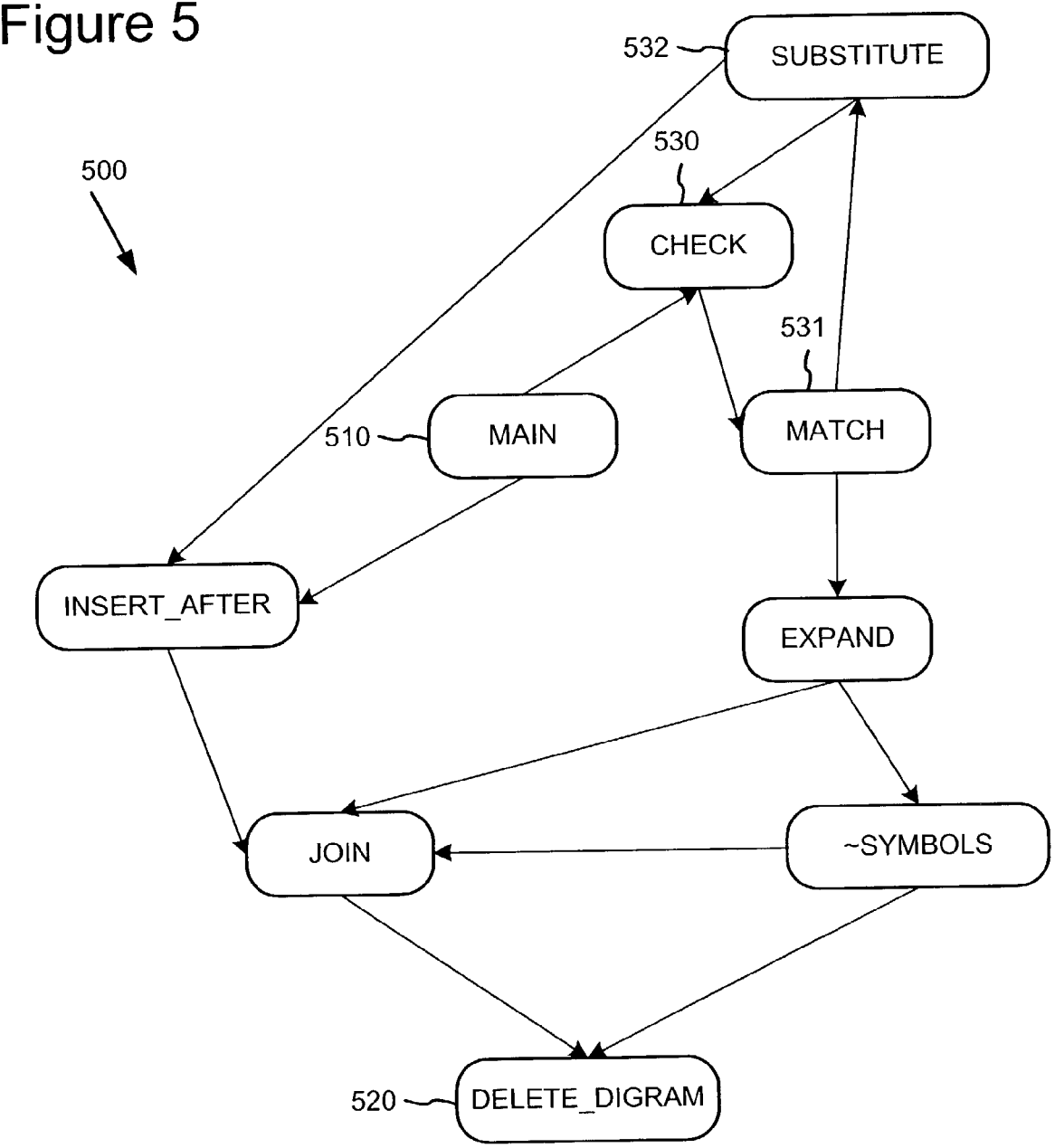
FIG. 5 is a call graph of an example program to be modified according to an improved framework for low-overhead burst profiling.

For example, FIG. 5 illustrates a call graph 500 of an exemplary program being structured by the tool 122 according to the low-overhead temporal profiling framework. In this call graph 500, the only root is procedure main 510, and the only leaf procedure is delete-digram 520. The only non-trivial strongly connected component in the call graph 500 is the component 650 (of procedures {check, match, substitute} 530–532).

Figure 6:
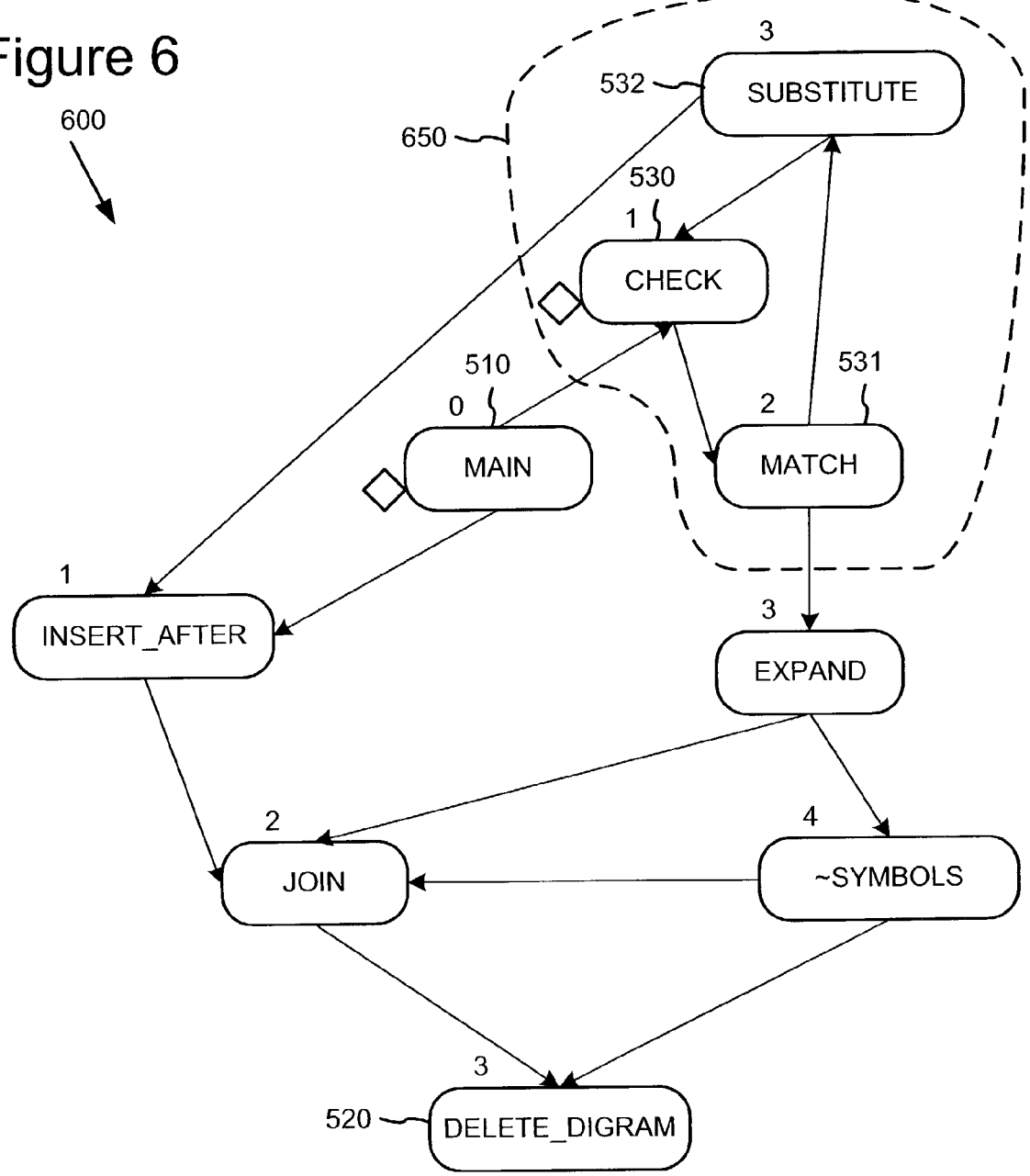
FIG. 6 is an illustration of an analysis of the call graph of FIG. 5 for modifying the example program according to the improved framework for low-overhead burst profiling.

FIG. 6 illustrates an analysis 600 of the call graph 500 by the tool 122 to determine the set of procedures for entry check placement. For this analysis, the tool 122 begins with a breadth-first search of the call graph. The tool calculates the distances (e.g., from 0 to 4 in this example) of each procedure from the root procedure (main 510), and determines that only the procedure check 530 has recursion from below, since it is called from the procedure substitute 532 which is further away from the root procedure main 510. The tool 122 thus determines that for this example with call graph 500, only the procedures main 510 and check 530 meet the above criteria for placing an entry check (i.e., the above expression evaluates to the minimum set C={main, check} for this call graph). Accordingly, by placing a check on entry to every procedure in this minimum set C={main, check}, the program cannot recurse indefinitely without executing checks.

Eliminating Checks at Loop Back-Edges

In the low-overhead temporal profiling framework, the instrumentation tool 122 also places checks at fewer than all loop back-edges in the program. In particular, the instrumentation tool 122 eliminates checks for some tight inner loops. This is because a dynamic optimizer that complements a static optimizer may often find the profiling information from tight inner loops to be of little interest because static optimization excels at optimizing such loops. At the same time, checks at the back-edges of tight inner loops can become extremely expensive (i.e., create excessive overhead relative to potential optimization performance gain). With the dynamic optimizer 100 that prefetches data into cache memory based on hot data streams, loops that compare or copy arrays preferably should not have checks. Such loops typically are easy to optimize statically, the check on the back-edge is almost as expensive as the loop body, and the loop body contains too little work to overlap with the prefetch.

More particularly, the instrumentation tool 122 eliminates checks on loop back-edges of loops meeting a "k-boring loops" criteria. According to this criteria, k-boring loops are defined as loops with no calls and at most a number (k) of profiling events of interest. The instrumentation tool 122 does not instrument either version of the code of a k-boring loop, and does not place a check on its back-edge. Since the loop is not included in the instrumented code 320 (FIG. 1) version, the program image 130 does not spend an unbounded amount of time executing in instrumented code. The program image may spend an unbounded amount of time executing such a loop in uninstrumented code (checking code 330 of FIG. 1) without executing a check. But, if the k-boring loop hypothesis holds (i.e., there is little or no gain from optimizing such loops with hot data stream prefetching), the dynamic optimizer 120 does not miss interesting profiling information. Experiments have shown that the quality of the profile actually improved when instrumenting of back-edge checks were eliminated from 4-boring loops (i.e., k=4) in an experimental program image, where the quality of the profile is measured by the ability to detect hot data streams. Accordingly, eliminating k-boring loop from profiling helps focus sampling on more interesting events (for optimizing with hot data stream prefetching).

In alternative implementations, the instrumentation tool 122 may eliminate additional checks on loop back-edges. For example, the instrumentation tool may eliminate back-edge checks from a loop that has only a small, fixed number of iterations. Further, if a check is always executing within a loop body, the loop does not need a check on the loop's back-edge. In yet further alternative implementations, the instrumentation tool 122 can combine the loop counter with the profiling phase counter; if the counters are linearly related, the program image can execute checks for the loop via a predicate on the loop counter, rather than updating the profiling counter each iteration of the loop.

3. Hot Data Stream Prefetching

Figure 7:
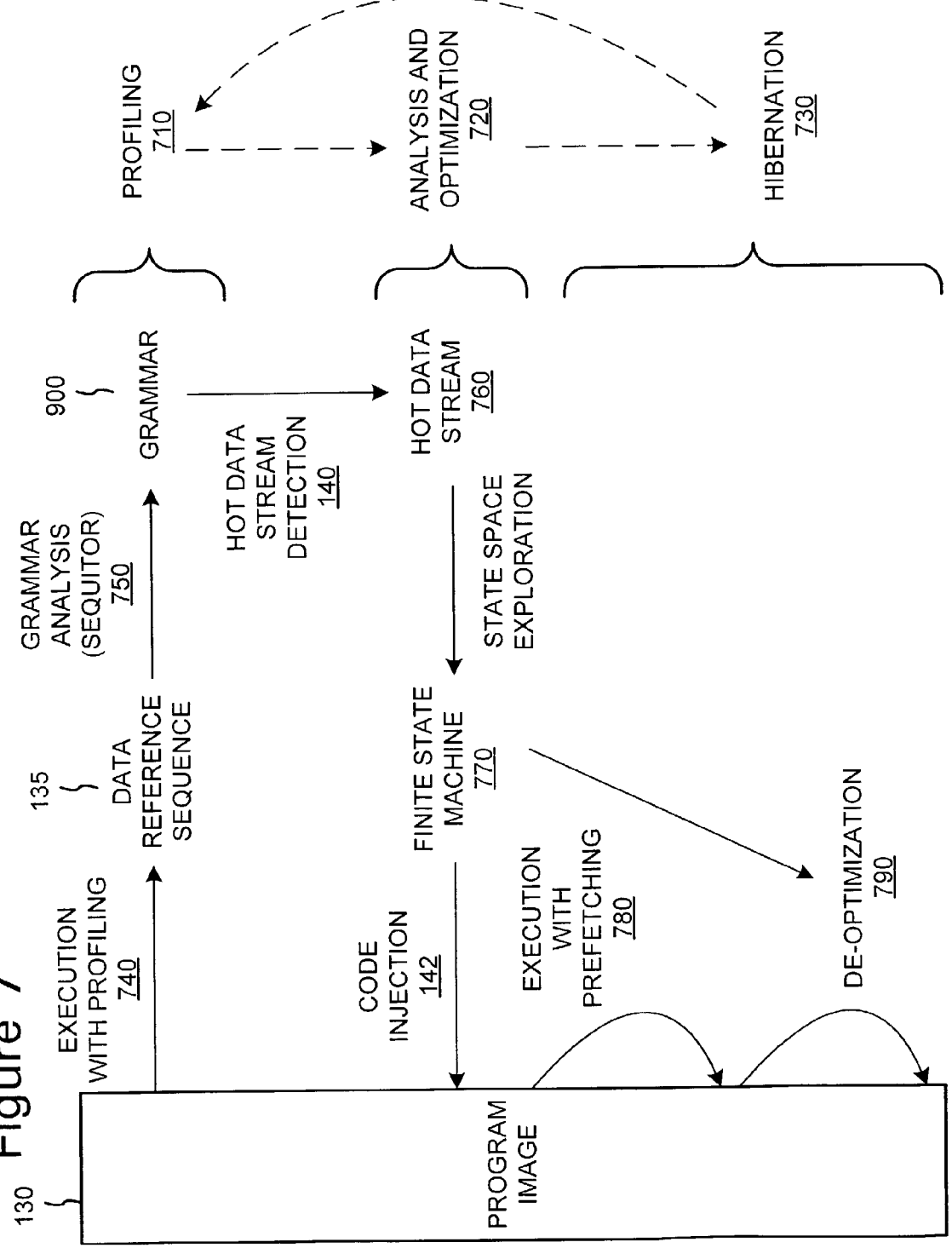
FIG. 7 is a data flow diagram illustrating processing for dynamic optimization of a program image in the dynamic optimizer of FIG. 1.

With reference now to FIG. 7, the temporal profiling 710 using the above-described low-overhead, long burst temporal profiling framework 300 (FIG. 3) is a first phase in an overall dynamic optimization process 700 based on hot data stream prefetching. The dynamic optimization process 700 operates in three phases—profiling 710, analysis and optimization 720, and hibernation 730. First, the profiling phase collects (740) a temporal data reference profile 135 from a running program with low-overhead, which is accomplished using the program image 130 (FIG. 1) structured according to the improved temporal profiling framework 300. As described in more detail below, a grammar analysis using the Sequitur compression process 750 incrementally builds an online grammar representation 900 of the traced data references.

Once sufficient data references have been traced, profiling is turned off, and the analysis and optimization phase 720 commences. First, a fast hot data stream detection 140 extracts hot data streams 760 from the Sequitur grammar representation 900. Then, a prefetching engine 142 builds a stream prefix matching deterministic finite state machine (DFSM) 770 for these hot data streams, and dynamically injects checks at appropriate program points to detect and prefetch these hot data streams in the program image 130. This dynamic prefetching based on a DFSM is described in more detail in co-pending Chilimbi, T., DYNAMIC PREFETCHING OF HOT DATA STREAMS, patent application Ser. No. 11/280,476 filed on Nov. 15, 2005, which is hereby incorporated herein by reference.

Finally, the process enters the hibernation phase where no profiling or analysis is performed, and the program continues to execute (780) as optimized with the added prefetch instructions. At the end of the hibernation phase, the program image 130 is de-optimized (790) to remove the inserted checks and prefetch instructions, and control returns to the profiling phase 710. For long-running programs, this profiling 710, analysis and optimization 720 and hibernate 730 cycle may repeat multiple times.

Figure 8:
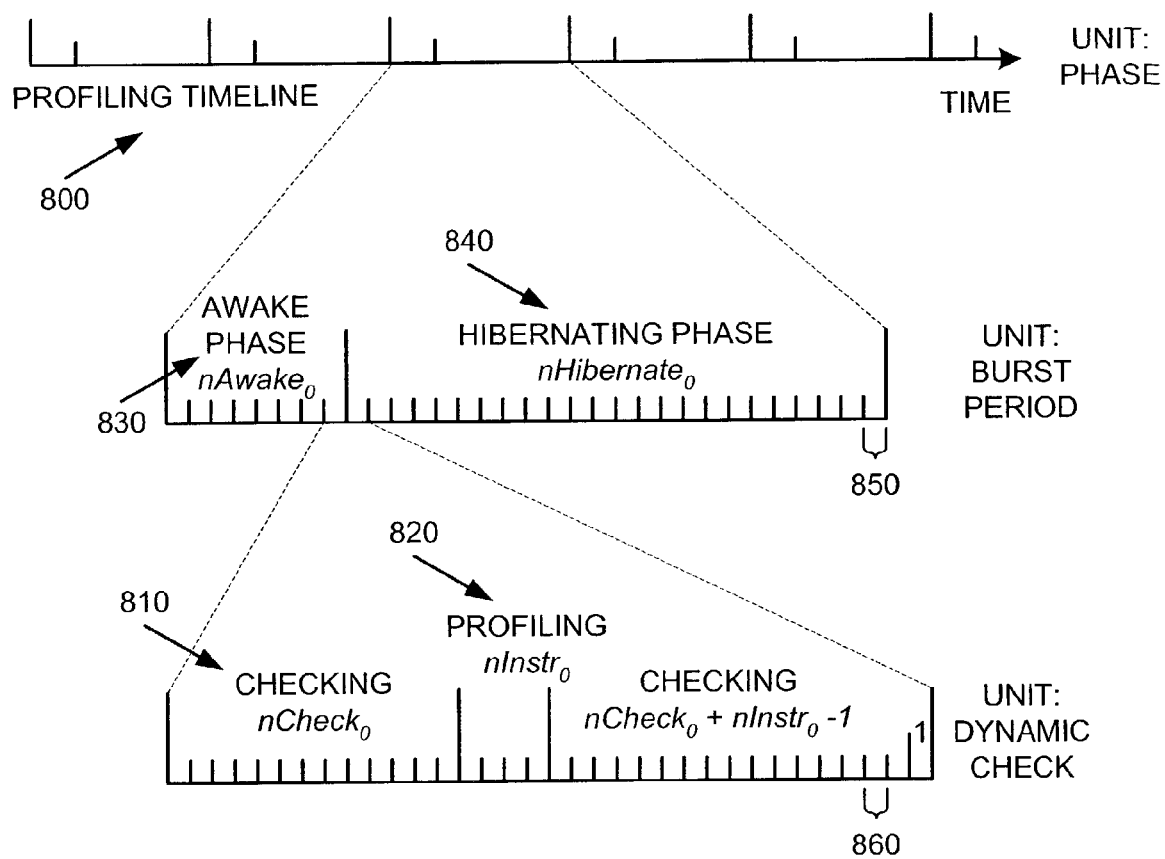
FIG. 8 is a timeline showing phases of the low-overhead, long burst temporal profiling by the dynamic optimizer of FIG. 1.

FIG. 8 shows a timeline 800 for the three phase profiling, analysis and optimization, and hibernation cycle operation of the dynamic optimizer 100 (FIG. 1). As discussed above, the low-overhead, long burst temporal profiling framework uses the checking phase and profiling phase counters (nCheck, nInstr) to control its overhead and sampling rate of profiling, by transitioning between a checking phase 810 in which the program image 130 (FIG. 1) executes in its non-instrumented checking code 330 (FIG. 3) and a profiling phase 820 in which it executes in its instrumented code 320 (FIG. 3). The time periods for these checking and profiling phase are parameterized by the $nCheck_0$ and $nInstr_0$ counter initialization values. For example, setting $nCheck_0$ to 9900 and $nInstr_0$ to 100 results in a sampling rate of profiling of 100/10000=1% and a burst length of 100 dynamic checks. The time spent for one iteration of the checking and profiling phase ($nCheck_0$+$nInstr_0$) is referred to as a burst period 850.

For dynamic optimization, the above-described low-overhead temporal profiling framework 300 (FIG. 3) is further extended to alternate between two additional phases, awake 830 and hibernating 840, which are controlled via two additional (awake and hibernating) counters. The temporal profiling framework starts out in the awake phase 830, and continues operating in the awake phase for a number ($nAwake_0$) of burst-periods, yielding ($nAwake_0 \times nInstr_0$) checks (860) worth of traced data references (or "bursts"). Then, as described above and illustrated in FIG. 7, the dynamic optimizer 100 performs the optimizations, and then the profiler hibernates while the optimized program executes. This is done by setting $nCheck_0$ to ($nCheck_0$+$nInstr_0$−1) and $nInstr_0$ to 1 for the next $nHibernate_0$ burst-periods (which causes the check code 400 in FIG. 4 to keep the program image executing in the non-instrumented checking code 330), where $nHibernate_0$ is much greater than $nAwake_0$. When the hibernating phase 840 is over, the profiling framework is "woken up" by resetting $nCheck_0$ and $nInstr_0$ to their original values.

While the profiling framework is hibernating, the program image traces next to no data references and hence incurs only the basic overhead of executing the checks 400 (FIG. 4). With the values of $nCheck_0$ and $nInstr_0$ set as described above during hibernation, the burst-periods correspond to the same time (in executed checks 860) in both awake and hibernating phases. This facilitates control over the relative length of the awake and hibernating phases by appropriately setting the initial value parameters $nAwake_0$ and $nHibernate_0$ of the awake and hibernating counters relative to each other.

Fast Hot Data Stream Detection

When the temporal profiling framework 300 executes in the instrumented code 320 (FIG. 3), the temporal profiling instrumentation produces data reference bursts or temporal data reference sequences 135 (FIGS. 1 and 7). A data reference r is a load or store operation on a particular address, represented in the exemplary dynamic optimizer 120 as a data pair (r.pc,r.addr). The "pc" value (i.e., r.pc), is the value of the program counter, which indicates the address in the executing program of the data load or store instruction being executed. The "addr" value (i.e., r.addr), is the memory location accessed by the load or store operation. The profiled burst is a temporal sequence or stream of these data references.

Figure 9:
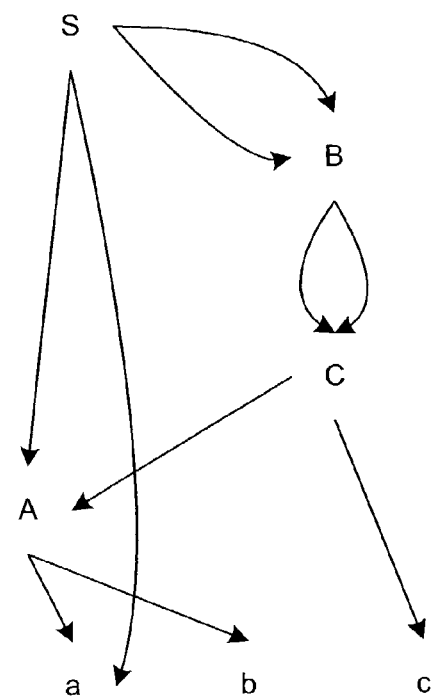
FIG. 9 is an illustration of grammar analysis of an exemplary data reference sequence in bursts profiled with the low-overhead, long burst temporal profiling forming part of the processing by the dynamic optimizer shown in FIG. 7.

During the profiling phase 710 (FIG. 7) as discussed above, this data reference sequence is incrementally processed into a compressed "Sequitur" grammar representation 900 using the Sequitur grammar analysis processing, as described in T. M. Chilimbi, "Efficient Representations And Abstractions For Quantifying And Exploiting Data Reference Locality," Proceedings Of The ACM SIGPLAN '01 Conference On Programming Language Design And Implementation (June 2001). FIG. 9 illustrates an example of a grammar 900 produced from an input data reference sequence (input string 910). The grammar 900 represents a hierarchical structure (a directed acyclic graph 920) of the data references.

More particularly, each observed data reference (r.pc, r.addr) is conceptually represented as a symbol in a grammar, and the concatenation of the profiled bursts is a string w of symbols (910). The Sequitur grammar analysis constructs a context-free grammar for the language {w} consisting of exactly one word, the string w. The Sequitur grammar analysis runs in time O(w.length). It is incremental (one symbol can be appended at a time), and deterministic. Thus, the grammar analysis can be performed as the profiled data is sampled during the profiling phase 710 (FIG. 7). The grammar 900 is a compressed representation of the input burst 910. Further, it is unambiguous and acyclic in the sense that no non-terminal directly or indirectly defines itself.

In the Sequitur grammar 910, the terminal nodes (denoted in small case letters) represent individual data references (r.pc,r.addr), which may be repeated in the profiled burst. The intermediate nodes (denoted in capital letters) represent temporal sequences of the data references. For example, the grammar 910 produced from the example input string 910 shows that the string S consists of the sequence "AaBB." A, in turn, consists of the data references a and b. The intermediate node B represents a sequence with two occurrences of the intermediate node C, which is a sequence of the intermediate node A and data reference c.

After construction of the grammar 900 in the profiling phase 710, the dynamic optimizer 100 performs a fast hot data stream detection 140 (FIGS. 1 and 7) to identify frequently recurring data reference subsequences (the "hot data streams") in the profiled bursts. For the fast hot data stream detection, the exemplary dynamic optimizer performs analysis of the grammar as represented in a hot data stream detection code 1000 shown in FIG. 10. The purposes of the fast hot data stream analysis is to identify hot data streams, which are a data reference subsequence in the profiled bursts, whose regularity magnitude exceeds a predetermined "heat" threshold, H. The regularity magnitude, given a data reference subsequence v, is defined as v.heat=v.length*v.frequency, where v.frequency is the number of non-overlapping occurrences of v in the profiled bursts.

The analysis in code 1000 is based on the observation that each non-terminal node (A) of a Sequitur grammar generates a language L(A)={$w_A$} with just one word $w_A$.

For the fast hot data stream detection analysis, the regularity magnitude of a non-terminal A is defined instead as A.heat=$w_A$.length*A.coldUses, where A.coldUses is the number of times A occurs in the (unique) parse tree of the complete grammar, not counting occurrences in sub-trees belonging to hot non-terminals other than A. A non-terminal A is hot iff minLen<=A.length<=maxlen and H<=A.heat, where H is the predetermined heat threshold. The result of the analysis is the set {$w_A$|A is a hot non-terminal} of hot data streams.

FIGS. 11 and 12 show an example 1100 of the analysis in the code 1000 (FIG. 10) for the input data reference sequence 910 and grammar 900 in FIG. 9. As a result of the Sequitur grammar analysis 750 (FIG. 7), the input data reference sequence has been parsed (as shown by parse tree 1110) and sub-sequences grouped under intermediate (non-terminal) nodes into the Sequitur grammar (1120). Further, the Sequitur grammar analysis also yields the length of the subsequence represented in each non-terminal node of the grammar 1120. Accordingly, the information shown in the first three columns (the non-terminal nodes, their children, and their lengths) of the table 1200 is provided to the fast hot data stream detection analysis. As shown in FIGS. 11 and 12, a non-terminal node is considered the child of another non-terminal node if it is listed on the right-hand side of the grammar rule of the other non-terminal node in Sequitur grammar 900 (FIG. 9).

In the fast hot data stream analysis code 1000, the analyzer 140 (FIG. 1) first executes instructions (1010) to perform a reverse post-order numbering of the non-terminal nodes in the grammar. For the example grammar, the results in numbering the nodes S, A, B, and C as 0, 3, 1 and 2, respectively, as shown in the index column of the table 1200 (FIG. 12) and illustrated in the reverse postorder numbering tree 1130 (FIG. 11). This results in the non-terminal nodes being numbered such that whenever a non-terminal node (e.g., node C) is a child of another non-terminal node (e.g., B), the number of the child node is greater (e.g., B.index<C.index). This property guarantees that the analysis does not visit a non-terminal node before having visited all its predecessors.

The analyzer 140 next determines at instructions 1020 in code 1000 how often each non-terminal node occurs in the parse-tree 1110 (FIG. 11), which is represented in the "use" column of the table 1200 (FIG. 12). Each of the non-terminal nodes is now associated with two values, its number of "hot uses" and its length, which are depicted conceptually in the uses:length tree 1140 (FIG. 11).

Finally, the analyzer 140 finds the number of "cold uses" for each non-terminal node, which are the number of hot uses not attributable in the "cold uses" of a "hot" predecessor node. More specifically, the analyzer finds hot non-terminal nodes such that a non-terminal node is only considered hot if it accounts for enough of the trace on its own, where it is not part of the expansion of the other hot non-terminals. In the example grammar with a heat threshold (H=8) and length restrictions (minLen=2, maxLen=7), only the non-terminal node B is considered as "hot," since its "heat" (cold uses×length=2×6=12) exceeds the heat threshold (12>8). All uses of the non-terminal node C are completely subsumed its the predecessor "hot" non-terminal node B and therefore is not considered hot (its heat=cold uses×length=0×3=0). The non-terminal node A has a single use apart from as a subsequence of the "hot" non-terminal node B, but this single use is not sufficient to exceed the heat threshold (A's cold uses×length=1×3=3<8). The single hot non-terminal node B represents the hot data stream $w_B$=abcabc, which accounts for 12/15=80% of all data references in this example burst.

4. Computing Environment

Figure 13:
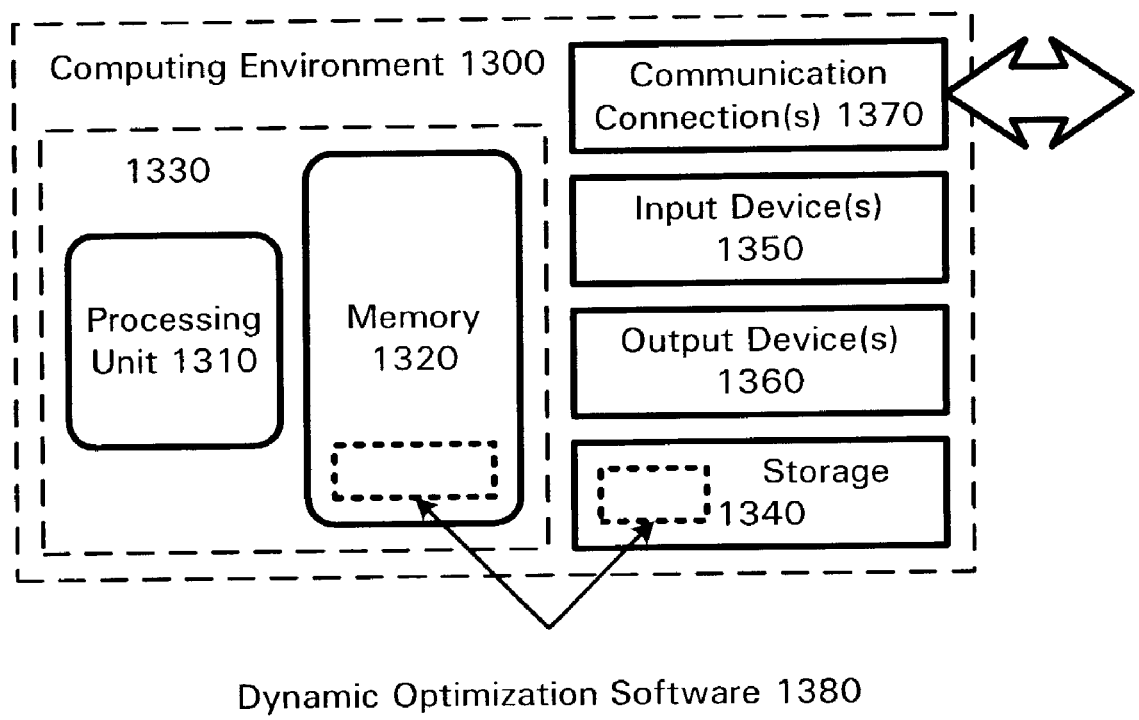
FIG. 13 is a block diagram of a suitable computing device environment for devices in the network device architecture of FIG. 1.

FIG. 13 illustrates a generalized example of a suitable computing environment 1300 in which the described techniques can be implemented. The computing environment 1300 is not intended to suggest any limitation as to scope of use or functionality of the invention, as the present invention may be implemented in diverse general-purpose or special-purpose computing environments.

With reference to FIG. 13, the computing environment 1300 includes at least one processing unit 1310 and memory 1320. In FIG. 13, this most basic configuration 1330 is included within a dashed line. The processing unit 1310 executes computer-executable instructions and may be a real or a virtual processor. In a multi-processing system, multiple processing units execute computer-executable instructions to increase processing power. The memory 1320 may be volatile memory (e.g., registers, cache, RAM), non-volatile memory (e.g., ROM, EEPROM, flash memory, etc.), or some combination of the two. The memory 1320 stores software 1380 implementing the dynamic optimizer 100 (FIG. 1).

A computing environment may have additional features. For example, the computing environment 1300 includes storage 1340, one or more input devices 1350, one or more output devices 1360, and one or more communication connections 1370. An interconnection mechanism (not shown) such as a bus, controller, or network interconnects the components of the computing environment 1300. Typically, operating system software (not shown) provides an operating environment for other software executing in the computing environment 1300, and coordinates activities of the components of the computing environment 1300.

The storage 1340 may be removable or non-removable, and includes magnetic disks, magnetic tapes or cassettes, CD-ROMs, CD-RWs, DVDs, or any other medium which can be used to store information and which can be accessed within the computing environment 1300. The storage 1340 stores instructions for the dynamic optimizer software 1380.

The input device(s) 1350 may be a touch input device such as a keyboard, mouse, pen, or trackball, a voice input device, a scanning device, or another device that provides input to the computing environment 1300. For audio, the input device(s) 1350 may be a sound card or similar device that accepts audio input in analog or digital form, or a CD-ROM reader that provides audio samples to the computing environment. The output device(s) 1360 may be a display, printer, speaker, CD-writer, or another device that provides output from the computing environment 1300.

The communication connection(s) 1370 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The device connectivity and messaging techniques herein can be described in the general context of computer-readable media. Computer-readable media are any available media that can be accessed within a computing environment. By way of example, and not limitation, with the computing environment 1300, computer-readable media include memory 1320, storage 1340, communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method of instrumenting a program to provide sampled temporal profiling bursts of a program execution trace, the method comprising:
   providing a duplicate version of at least some procedures in the program with instrumentation for capturing a temporal sequence of data references by the program;
   inserting check code at locations of at least some procedure entries and loop back-edges of the program;
   alternately tracking a number of iterations of the check code executed in a checking phase and a profiling phase up to respective checking and profiling count parameters, wherein the profiling count parameter is more than one and the duplicate version of at least some procedures with instrumentation are executed during the profiling phase and a non-instrumented version of the program's procedures are executed during the checking phase;
   upon executing the check code when in the checking phase, causing execution to proceed in the non-instrumented version of the program's procedures;
   upon executing the check code when in the profiling phase, causing execution to proceed in the duplicate instrumented version of the at least some procedures; and
   switching between checking and profiling phases upon the tracked number of iterations of the check code reaching the respective count parameter of the respective phase.

2. The method of claim 1 further comprising inserting the check code also at locations of at least some loop back-edges of the duplicate version of the at least some procedures.

3. The method of claim 1 wherein the action of inserting the check code comprises:
   analyzing a call-graph of the program to identify any leaf procedures, root procedures, procedures whose address is taken and procedures with recursion from below; and
   inserting the check code on a set of procedure entries less than all procedure entries in the program, but including entries to non-leaf procedures that are root procedures, procedures whose address is taken and procedures with recursion from below.

4. The method of claim 1 wherein the action of inserting the check code comprises:
   analyzing a call-graph of the program to identify any leaf procedures, root procedures, procedures whose address is taken and procedures with recursion from below; and
   inserting the check code at procedure entry locations only on entries to non-leaf procedures that are root procedures, procedures whose address is taken and procedures with recursion from below.

5. The method of claim 1 wherein the action of inserting the check code comprises:
   identifying loops in the program that meet a criteria as lacking interest for temporal profiling; and
   excluding such identified loops from inserting the check code at locations of back-edges from such identified loops.

6. The method of claim 5 further comprising excluding such identified loops from providing a duplicate instrumented version thereof.

7. The method of claim 5 wherein the criteria for lacking interest for temporal profiling comprises that the loop contains no calls and fewer than a predetermined number of profiling events.

8. The method of claim 5 wherein the criteria for lacking interest for temporal profiling comprises that the loop has only a fixed number of iterations fewer than a predetermined minimum.

9. The method of claim 1 wherein the action of inserting the check code comprises:
   identifying any loops in the program that contain the check code in the loop body; and
   excluding such identified loops from inserting the check code at locations of back-edges from such identified loops.

10. A method of instrumenting a program to provide sampled temporal profiling bursts of a program execution trace, the method comprising:
    providing a duplicate version of at least some procedures in the program with instrumentation for capturing a temporal sequence of data references by the program;
    inserting check code at locations of at least some procedure entries and loop back-edges of the program, wherein the action of inserting the check code comprises:
       analyzing a call-graph of the program to identify any leaf procedures, root procedures, procedures whose address is taken and procedures with recursion from below, and
       inserting the check code on a set of procedure entries less than all procedure entries in the program, but including entries to non-leaf procedures that are root procedures, procedures whose address is taken and/or procedures with recursion from below;
    tracking a number of iterations of the check code executed in a checking phase up to a checking count parameter;
    upon executing the check code when in the checking phase, causing execution to proceed in a non-instrumented version of the program's procedures;
    switching to a profiling phase upon the tracked number of iterations of the check code in the checking phase reaching the checking count parameter.

11. A method of claim 10 further comprising inserting the check code at procedure entry locations only on entries to non-leaf procedures that are root procedures, procedures whose address is taken and/or procedures with recursion from below.

12. A method of instrumenting a program to provide sampled temporal profiling bursts of a program execution trace, the method comprising:
    providing a duplicate version of at least some procedures in the program with instrumentation for capturing a temporal sequence of data references by the program;
    inserting check code at locations of at least some procedure entries and loop back-edges of the program, wherein the action of inserting the check code comprises:
       identifying loops in the program that meet a criteria as lacking interest for temporal profiling, and
       excluding such identified loops from inserting the check code at locations of back-edges from such identified loops;
    tracking a number of iterations of the check code executed in a checking phase up to a checking count parameter;
    upon executing the check code when in the checking phase, causing execution to proceed in a non-instrumented version of the program's procedures;
    switching to a profiling phase upon the tracked number of iterations of the check code in the checking phase reaching the checking count parameter.

13. The method of claim 12 further comprising excluding such identified loops from providing a duplicate instrumented version thereof.

14. The method of claim 12 wherein the criteria for lacking interest for temporal profiling comprises that the loop contains no calls and fewer than a predetermined number of profiling events.

15. The method of claim 12 wherein the criteria for lacking interest for temporal profiling comprises that the loop has only a fixed number of iterations fewer than a predetermined minimum.

16. A method of instrumenting a program to provide sampled temporal profiling bursts of a program execution trace, the method comprising:
providing a duplicate version of at least some procedures in the program with instrumentation for capturing a temporal sequence of data references by the program;
inserting check code at locations of at least some procedure entries and loop back-edges of the program, wherein the action of inserting the check code comprises:
identifying any loops in the program that contain the check code in the loop body, and
excluding such identified loops from inserting the check code at locations of back-edges from such identified loops;
tracking a number of iterations of the check code executed in a checking phase up to a checking count parameter;
upon executing the check code when in the checking phase, causing execution to proceed in a non-instrumented version of the program's procedures;
switching to a profiling phase upon the tracked number of iterations of the check code in the checking phase reaching the checking count parameter.

17. A dynamic optimizer of a computer system comprising:
an instrumentation insertion tool operating to modify a program to provide duplicate versions of at least some procedures in the program containing instrumentation for capturing a temporal data reference sequence for sampled bursts of an execution trace of the program; and
a check code insertion tool operating to modify the program to place checks at procedure entries and loop back-edges in the program, including at loop back-edges of the instrumented duplicate versions of procedures, the checks updating a checking phase counter tracking a number of check executions and causing a transition to the instrumented duplicate versions of procedures from a non-instrumented versions of procedures upon the tracked number of check executions reaching a predetermined checking phase count parameter;
wherein the dynamic optimizer is computer implemented.

18. The dynamic optimizer of claim 17 wherein the checks further update a profiling phase counter tracking a number of check executions and causing a transition back from the instrumented duplicate versions of procedures upon the tracked number of check executions reaching a predetermined profiling phase count parameter.

19. A dynamic optimizer of a computer system comprising:
an instrumentation insertion tool operating to modify a program to provide duplicate versions of at least some procedures in the program containing instrumentation for capturing a temporal data reference sequence for sampled bursts of an execution trace of the program; and
a check code insertion tool operating to modify the program to place checks at fewer than all procedure entries and loop back-edges in the program that meet a placement criteria for avoiding unbounded execution without executing checks, the checks updating a checking phase counter tracking a number of check executions and causing a transition to the instrumented duplicate versions of procedures from a non-instrumented versions of procedures upon the tracked number of check executions reaching a predetermined checking phase count parameter;
wherein the dynamic optimizer is computer implemented.

20. The dynamic optimizer of claim 19 wherein the placement criteria for placing checks at procedure entries includes only entries to non-leaf procedures that are root procedures, procedures whose address is taken and/or procedures with recursion from below.

21. The dynamic optimizer of claim 19 wherein the placement criteria for placing checks at loop back-edges excludes k-boring loops that contain no calls and fewer than k events for temporal data reference profiling.

22. The dynamic optimizer of claim 19 wherein the placement criteria for placing checks at loop back-edges excludes loops that have a fixed number of iterations that is small relative to a parameter.

23. The dynamic optimizer of claim 19 wherein the placement criteria for placing checks at loop back-edges excludes loops that contain checks in the loop's body.

24. A computer-readable program storage device medium having a program carried thereon instrumented according to a temporal profiling framework, the framework comprising:
non-instrumented versions of procedures of the program;
duplicate versions of at least some procedures of the program, the duplicate versions being instrumented to capture a temporal data reference sequence for sampled bursts of an execution trace of the program;
checks for transition between a checking phase wherein the program executes in non-instrumented versions of procedures and a profiling phase wherein the program executes in the instrumented duplicate versions, at least some of the checks located at loop back-edges from the instrumented duplicate versions, the checks updating a checking phase counter tracking a number of check executions and causing a transition to the instrumented duplicate versions of procedures from the non-instrumented versions of procedures, upon the tracked number of check executions reaching a predetermined checking phase count parameter.

25. A computer-readable program storage device medium having a program carried thereon instrumented according to a temporal profiling framework, the framework comprising:
non-instrumented versions of procedures of the program;
duplicate versions of at least some procedures of the program, the duplicate versions being instrumented to capture a temporal data reference sequence for sampled bursts of an execution trace of the program;
checking and profiling phase counters;
checks for incrementally updating the checking and profiling phase counters, and causing transition between a checking phase wherein the program executes in non-instrumented versions of procedures and a profiling phase wherein the program executes in the instrumented duplicate versions upon the checking and profiling phase counters counting predetermined numbers of checks executed in the respective phases, such that the profiling phase continues for a count of plural checks.

26. The computer-readable program storage device medium of claim 25 wherein the framework further comprises the checks being located at a plurality of locations of procedure entries and loop back-edges fewer than all procedure entries and loop back-edges.

27. The computer-readable program storage device medium of claim 26 wherein the checks located at procedure entries excludes procedure entries other than entries to non-leaf procedures that are root procedures, procedures whose address is taken and/or procedures with recursion from below.

28. The computer-readable program storage device medium of claim 26 wherein the checks located at loop back-edges excludes back-edges of k-boring loops that contain no calls and fewer than k events for temporal data reference profiling.

29. The computer-readable program storage device medium of claim 26 wherein the checks located at loop back-edges excludes back-edges of loops that have a fixed number of iterations that is small relative to a parameter.

30. The computer-readable program carrying medium of claim 26 wherein the checks located at loop back-edges excludes back-edges of loops that contain checks in the loop's body.

31. The computer-readable program storage device medium of claim 25 wherein the check comprises:

an instruction incrementally updating the check phase counter; and a conditional branch instruction for causing execution to continue in the non-instrumented versions for the checking phase if the check phase counter indicates the predetermined number of checks in the checking phase has not been reached.

32. The computer-readable program storage device medium of claim 31 wherein the check further comprises, after the instruction incrementally updating the check phase counter and conditional branch instruction:

an instruction setting the checking phase counter to an increment short of the predetermined number of checks for the checking phase;

an instruction incrementally updating the profiling phase counter; and a conditional branch instruction for causing execution to proceed in the instrumented duplicate versions if the profiling phase counter indicates the predetermined number of checks in the profiling phase has not been reached.

* * * * *